(12) United States Patent
Thiesson et al.

(10) Patent No.: US 7,418,430 B2
(45) Date of Patent: Aug. 26, 2008

(54) DYNAMIC STANDARDIZATION FOR SCORING LINEAR REGRESSIONS IN DECISION TREES

(75) Inventors: Bo Thiesson, Woodinville, WA (US); David M. Chickering, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 756 days.

(21) Appl. No.: 10/628,546

(22) Filed: Jul. 28, 2003

(65) Prior Publication Data
US 2005/0027665 A1    Feb. 3, 2005

(51) Int. Cl.
*G06F 15/18*    (2006.01)
*G05B 13/02*    (2006.01)

(52) U.S. Cl. ............................... 706/12; 706/14; 700/28
(58) Field of Classification Search ............ 706/25, 706/12, 14; 700/28
See application file for complete search history.

(56) References Cited

U.S. PATENT DOCUMENTS

| | | | |
|---|---|---|---|
| 4,982,430 A * | 1/1991 | Frezza et al. | 380/211 |
| 6,044,366 A * | 3/2000 | Graffe et al. | 707/2 |
| 6,496,816 B1 * | 12/2002 | Thiesson et al. | 706/52 |
| 6,532,457 B1 * | 3/2003 | Tal et al. | 707/1 |
| 6,871,201 B2 * | 3/2005 | Yu et al. | 707/7 |
| 6,920,458 B1 * | 7/2005 | Chu et al. | 707/102 |
| 6,941,318 B1 * | 9/2005 | Tamayo et al. | 707/102 |
| 2003/0023662 A1 * | 1/2003 | Yaung | 709/106 |
| 2003/0061213 A1 * | 3/2003 | Yu et al. | 707/7 |
| 2003/0065635 A1 * | 4/2003 | Sahami et al. | 706/48 |
| 2003/0130855 A1 * | 7/2003 | Babu et al. | 704/500 |
| 2004/0002879 A1 * | 1/2004 | Bernhardt et al. | 705/7 |
| 2004/0002981 A1 * | 1/2004 | Bernhardt et al. | 707/100 |
| 2004/0019598 A1 * | 1/2004 | Huang et al. | 707/100 |
| 2004/0243548 A1 * | 12/2004 | Hulten et al. | 707/3 |

OTHER PUBLICATIONS

Chickering et al, "Efficient Determination of Dynamic Split Points in a Decision Tree", Proceedings of the IEEE International Conference of Data Mining, Nov. 29-Dec. 2, 2001.*

(Continued)

*Primary Examiner*—David Vincent
*Assistant Examiner*—Melissa J Berman
(74) *Attorney, Agent, or Firm*—Amin, Turocy & Calvin, LLP

(57) ABSTRACT

The present invention relates to a system and method to facilitate data mining applications and automated evaluation of models for continuous variable data. In one aspect, a system is provided that facilitates decision tree learning. The system includes a learning component that generates non-standardized data that relates to a split in a decision tree and a scoring component that scores the split as if the non-standardized data at a subset of leaves of the decision tree had been shifted and/or scaled. A modification component can also be provided for a respective candidate split score on the decision tree, wherein the above data or data subset can be modified by shifting and/or scaling the data and a new score is computed on the modified data. Furthermore, an optimization component can be provided that analyzes the data and determines whether to treat the data as if it was: (1) shifted, (2) scaled, or (3) shifted and scaled.

20 Claims, 9 Drawing Sheets

OTHER PUBLICATIONS

Chickering et al. "Efficient Determination of Dynamic Split Points in a Decision Tree". 2001 IEEE. pp. 91-98.*

Riskin et al. "Lookahead in Growing Tree-Structured Vector Quantizers". 1991 IEEE. pp. 2289-2292.*

Heckerman. "Bayesian Networks for Data Mining". 1997 Kluwer Academic Publishers. Data Mining and Knoweldge Discovery 1. pp. 79-88.*

Minka. "Bayesian linear regression". http://research.microsoft.com/~minka/papers/. Sep. 29, 1999. pp. 1-12.*

Dong et al. "Look-Ahead Based Fuzzy Decision Tree Induction". IEEE 2001. IEEE Transaction on Fuzzy Systems, vol. 9, No. 3. pp. 461-468.*

Fryer et al. "Microsoft Press Computer Dictionary". 1997 Microsoft Press. pp. 132.*

\* cited by examiner

DYNAMIC STANDARDIZATION FOR SCORING LINEAR REGRESSIONS IN DECISION TREES

TECHNICAL FIELD

The present invention relates generally to systems and methods that facilitate data mining and model evaluation. More particularly, the present invention relates to an efficient process for scoring splits in a decision tree in order to evaluate a model's performance while mitigating effects of any parameter prior used to score models.

BACKGROUND OF THE INVENTION

When learning decision trees for continuous variables (or other types), a scoring criterion employed to evaluate how well a tree fits a set of data is often a function of a prior distribution over respective parameters of the tree. In many instances, it is desirable that this prior information have as little effect on the resulting tree as possible. For example, assuming Normal distributed data, when modeling linear regressions in the leaves of a decision tree, a Bayesian scoring criterion generally requires a prior mean on respective inputs (regressors), a prior mean on a target, and a prior covariance matrix over the inputs and the target. Without knowing the domain of the problem, it is often difficult to anticipate what a useful set of priors will be. For instance, data could be in a 0.01 to 0.001 range or in a 100 to 1000 range in which case the prior distributions with least effect are very different.

One solution to the above problem is to pre-standardize data so that the data has a mean zero and standard deviation of one, thus utilizing a prior mean of zero for all variables and assuming a prior covariance matrix to be diagonal (i.e., assume apriori that all variables are independent). One problem with this solution is that after splitting on a variable in the decision tree, the data that results in different leaf nodes may have very different ranges, and therefore the original problem with the parameter prior is postponed until later in the learning algorithm It is also not favorable to shift or scale data each time a new split is considered in the tree, as this will generally cause an enormous runtime performance reduction due to the additional scaling or shifting operations. To illustrate scaling and shifting of data, the following example is provided.

A variable $x^k$ can be employed to denote a variable in some domain. A variable $\bar{x}_i$ denotes a vector of values for a set of variables in the ith case in the data. A variable $x_i^k$ denotes a value of the variable $x^k$ in the ith case. For example, if the data is:

|        | $x^1$ | $x^2$ | $x^3$ |
|--------|-------|-------|-------|
| Case 1 | 1     | 4     | 5     |
| Case 2 | 9     | 8     | 7     |

Then, $\bar{x}_1 = (1,4,5)$ and $x_2^2 = 8$.

Shifting the n cases $\bar{x}_1, \ldots, \bar{x}_n$ is defined as subtracting, for each variable $x^k$, a mean $m^k = \sum_{i=1}^{n} x_i^k / n$ from each case.

After shifting the data above yields:

|        | $x^1$ | $x^2$ | $x^3$ |
|--------|-------|-------|-------|
| Case 1 | -4    | -2    | -1    |
| Case 2 | 4     | 2     | 1     |

Scaling the cases is defined as dividing the value of each variable in each case by the standard deviation for that variable. The standard deviation for a variable is defined as:

$$SD(x^k) \sqrt{\frac{1}{n} \sum_{i=1}^{n} (x_i^k - m^k)^2}$$

(As can be appreciated, there are alternative formulas for standard deviation.)

In this example: $SD(x^1)=4$, $SD(x^2)=2$, $SD(x^3)=1$, and thus the scaled data is

|        | $x^1$ | $x^2$ | $x^3$ |
|--------|-------|-------|-------|
| Case 1 | 1/4   | 4/2   | 5     |
| Case 2 | 9/4   | 8/2   | 7     |

Generally, standardizing the cases is defined as first shifting and then scaling the data. The result is that each variable will have a mean of zero and a standard deviation of one in the data. As can be appreciated, with larger data sets and number of cases, and as decision tress grow in complexity, standardizing operations can be quite burdensome in terms of system performance such as the large amount of computer computations that may be required to perform such operations.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods for automatically evaluating statistical models in a computationally efficient manner. In one aspect, models are processed and learned from continuous variable data or subsets thereof to generate a decision tree that is employed to predict target data for various data types (e.g., economic data, mathematical data, age, education, income, and so forth). Such predictions can be utilized for various data mining applications, for example. In order to determine the accuracy or performance of the models, scores are generated at decision splits or leaves on the decision tree. When scoring a selected split in the decision tree, the present invention utilizes a same (or similar) prior distribution together with non-standardized data—yet scores the split as if the data at respective leaves had been shifted and/or scaled. This mitigates the effect of the prior distribution on (1) the shape of the tree and (2) the distributions in the leaves of that tree, and facilitates superior out-of-sample prediction accuracy.

As noted above, one aspect of the present invention is to score splits in a decision tree as if the data were shifted and/or scaled after the split. Thus, a learning component is provided that inputs continuous variable data and generates a decision tree having one or more decision branches or leaves that are then scored to determine the prediction capabilities of the model. A scoring component automatically analyzes the decision tree in conjunction with various processing modes to determine respective scores for selected branches of the tree.

After the branches have been scored, evaluation data can be generated indicating how well a model predicts continuous target data and therefore whether or not the model is a suitable predictor for the target data. The evaluation data can then be employed by users and/or subsequent automated components when determining model performance and/or selecting between models or model subsets.

An optimization component can also be provided with the present invention to calculate scores in the above manner without actually shifting and/or scaling the data. This allows resulting decision trees to be less sensitive to "uninformative" prior information, without incurring the runtime performance penalty that may result from rescaling data each time a new split is considered. Also, actual shifting and/or scaling operations can be applied to the data, if desired. It is noted that although continuous variable data is processed in accordance with the present invention, other types of data can also be processed. For example, since continuous target variables are generally predicted, input data applied to the learning models and resultant decision tress can be continuous data, non-continuous data, data subsets, and/or combinations thereof.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to a system and method to facilitate data mining applications and automated evaluation of models for continuous variable data. In one aspect, a system is provided that facilitates decision tree learning. The system includes a learning component that generates non-standardized data that relates to a split in a decision tree and a scoring component that scores the split as if the non-standardized data at a subset of leaves of the decision tree had been shifted and/or scaled. In this manner, computer-processing operations can be mitigated which enhances performance of associated algorithms for evaluating the decision tree. A modification component can also be provided for a respective candidate split score on the decision tree, wherein the above data or data subset can be modified by shifting and/or scaling the data and a new score is computed on the modified data. Furthermore, an optimization component can be provided that analyzes the data and determines whether to treat the data as if it was: (1) shifted, (2) scaled, or (3) shifted and scaled to further mitigate processing operations.

As used in this application, the terms "component," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Figure 1:
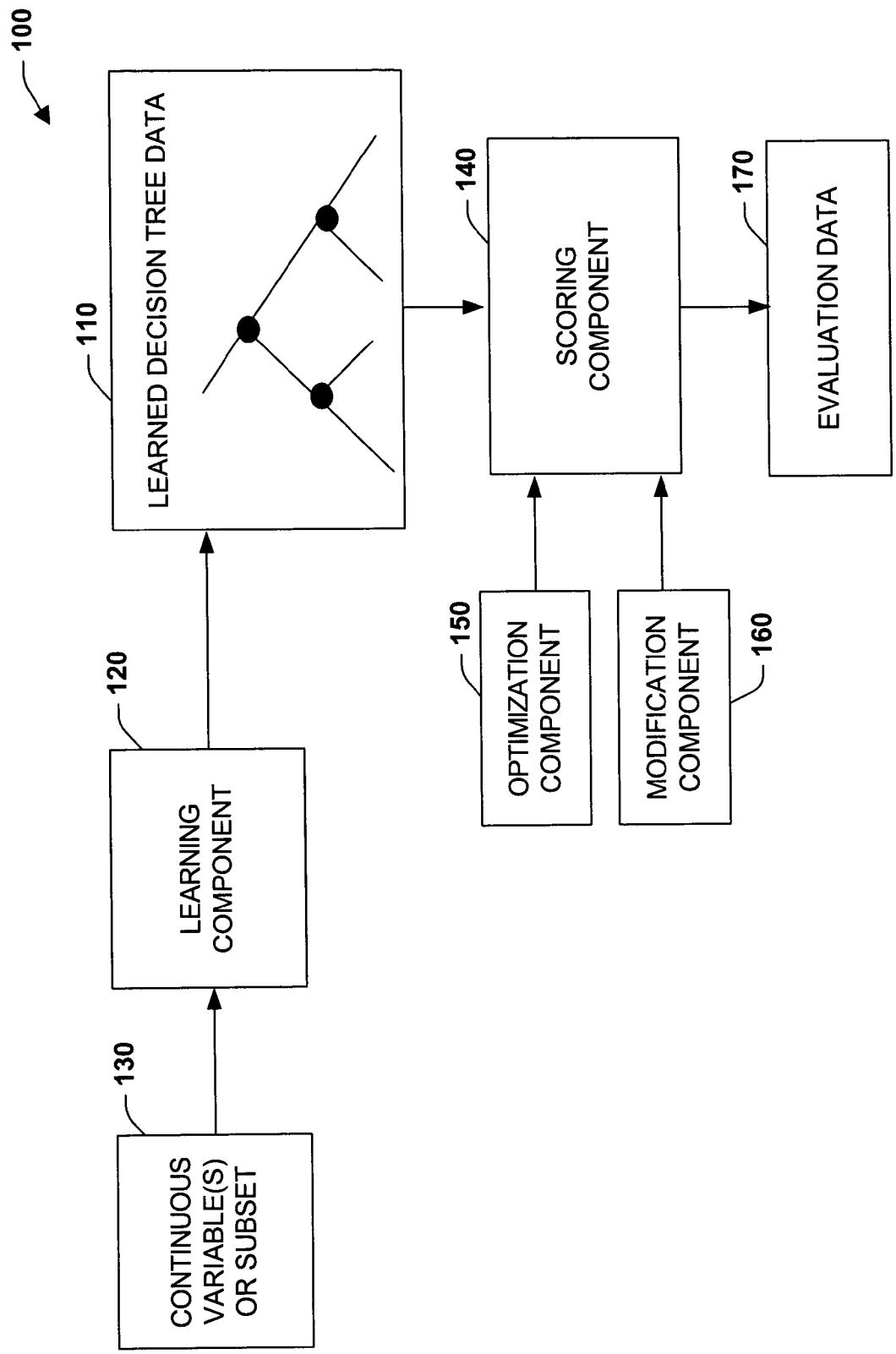
FIG. 1 is a schematic block diagram illustrating a model evaluation system in accordance with an aspect of the present invention.

Referring initially to FIG. 1, a system 100 illustrates a model evaluation system in accordance with an aspect of the present invention. Before proceeding it is noted that the present invention applies to data mining in general and decision-tree learning in particular although substantially any modeling/mining application can be similarly employed. In general, when scoring a split in a decision tree 110 (splits referring to nodes at one or more branches of the tree), the same or similar prior distribution is employed while scoring the split as if the data at respective leaves or branches of the tree 110 had been shifted and/or scaled. This mitigates the effect of the prior distribution on (1) the shape of the tree and (2) the distributions in the leaves of the tree, and thus can lead to improved out-of-sample prediction accuracy.

A learning component or model 120 is provided that inputs continuous variable data 130 (or data subset) and generates the decision tree 110 having one or more decision branches or leaves that are then scored to determine the prediction capabilities of the model. A scoring component 140 is provided that automatically analyzes the decision tree 110 in connection with various processing modes to determine respective scores for selected branches of the tree 110. Such processing modes can be enabled by an optimization component 150 and/or modification component 160 which are described in more detail below. After the branches of the decision tree 110 have been scored, evaluation data 170 can be generated indicating how well a model predicts continuous target data and therefore whether or not the model is a suitable predictor for the target data. The evaluation data 170 can then be employed by users and/or subsequent automated components (or other entities such as local or remote networked computers) when determining model performance and/or selecting between models or model subsets.

The optimization component 150 enables the scoring component 150 to calculate scores in the above manner without actually shifting and/or scaling the data (e.g., flags set to indicate shifting and/or scaling bypass operations). This enables resulting decision trees 110 to be less sensitive to "uninformative" prior information, without incurring the runtime performance penalty that may result from rescaling data each time a new split is considered or analyzed. Also, actual shifting and/or scaling operations can be applied to the data, if desired via the modification component 160 although system performance may be somewhat diminished.

It is to be appreciated that although continuous variable data 130 is processed in accordance with the present invention, other types of data can also be processed. For example, since continuous target variables are generally predicted by the learning component 120, input data applied to the learning models and resultant decision tress can be continuous data, non-continuous data, data subsets, and/or combinations thereof. Furthermore, in general one or more learning components or models 110 (e.g., prediction models, data mining models, Bayesian models) receive data from a training data set and predict continuous variable (CV) target data. The CV target data can include substantially any type of continuous variable prediction given the training data set. As one example, given known data associated with a person (e.g., education level, zip code, web sites visited, shopping selections, and so forth) predictions can be made regarding the person's income or age which are possible examples of continuous variables. It is to be appreciated the present invention is no so limited however, in that the learning component 110 can predict any type of continuous variable. For example, a mathematical model may observe analysis data from the training data set relating to an Engineering problem and produce a continuous variable prediction relating to one or more potential outcomes (e.g., oscillatory output prediction based upon a differential equation analysis).

Figure 2:
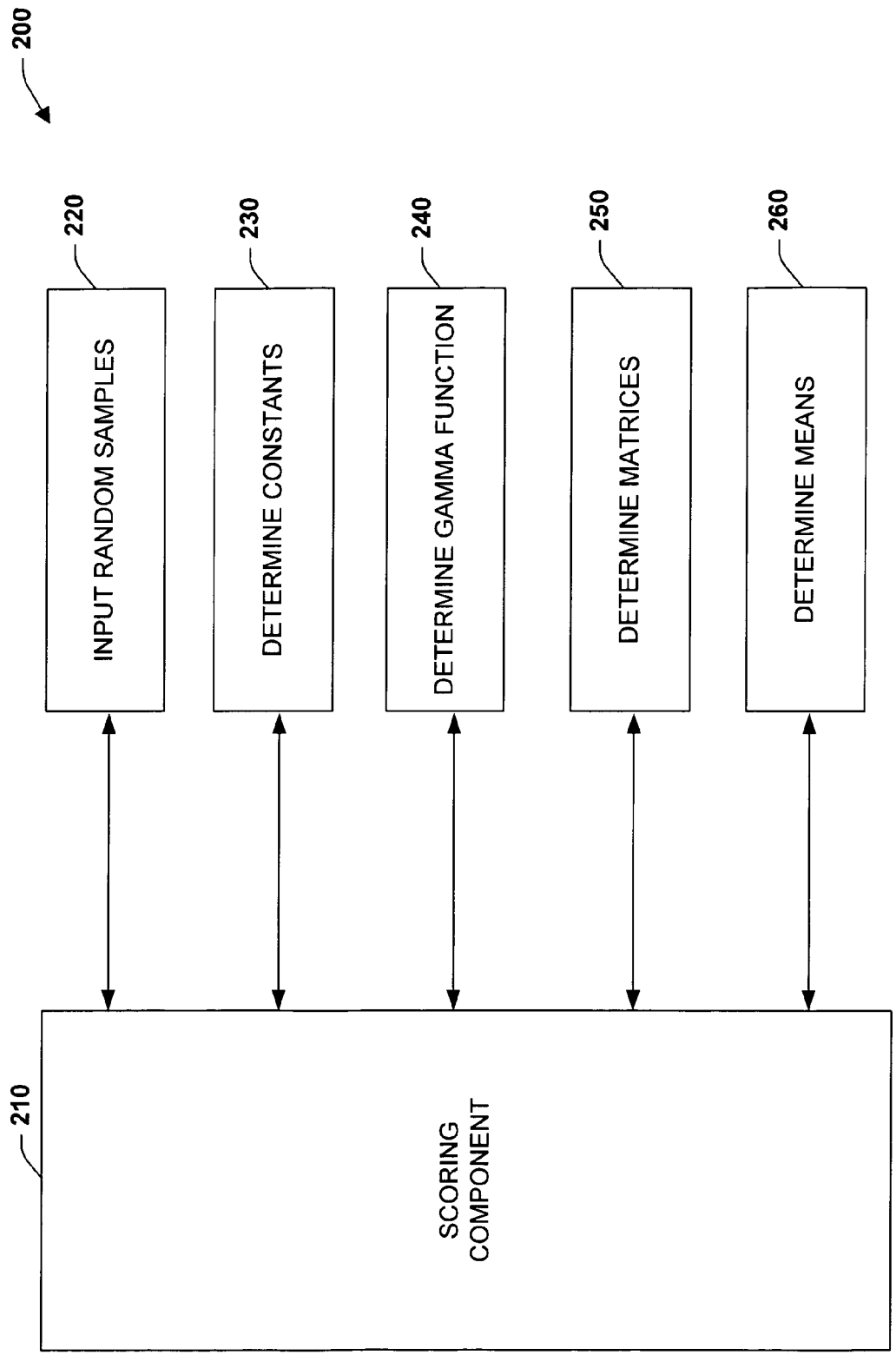
FIG. 2 is a diagram illustrating an exemplary scoring component in accordance with an aspect of the present invention.

Referring now to FIG. 2, a system 200 illustrates an exemplary scoring component 210 in accordance with an aspect of the present invention. The scoring component 210 includes various components to automatically score splits in a decision tree. Such aspects include processing random data samples at 220, determining scoring constants at 230, determining a gamma function at 240, determining matrix and/or vector values at 250, and determining mean values for the data at 260. The following describes a generalized scoring example given basic assumptions in order to illustrate one or more aspects of the scoring component 210.

For example, assume that $x_1, \ldots, x_n$ is a random sample from a multivariate normal distribution having an unknown value of a mean vector $\mu$ and an unknown value of a covariance matrix $\Sigma$, and assume that a prior joint distribution on $\mu$ and $\Sigma$ is a normal-Wishart distribution. Thus, the conditional distribution of $\mu$ given $\Sigma$ is $N(\mu_0, \Sigma/v)$ and the marginal distribution of $\Sigma$ is a Wishart distribution with $\alpha$ degrees of freedom and covariance matrix $T_0$, is denoted $W(\alpha, T_0)$. Also, assume $\mu_0 = 0$ and $T_0$ is a diagonal matrix, wherein diagonal elements are equal to a pre-defined constant $\beta$ (e.g., $\beta = 0.01$). Assuming that there are r regressors, then a Bayesian linear regression score can be computed as:

$$\text{score} = \pi^{-n/2} \left(\frac{v}{v+n}\right)^{1/2} \frac{\Gamma\left(\frac{\alpha+n}{2}\right)}{\Gamma\left(\frac{\alpha}{2}\right)} \left(\beta^{\frac{\alpha+r}{2}}\right) \frac{(|T_n^{TR}|)^{-\left(\frac{\alpha+n}{2}\right)}}{(|T_n^{R}|)^{-\left(\frac{\alpha-1+n}{2}\right)}}, \text{ where}$$

$$T_n = T_0 + S_n + U_n$$

$$U_n = \frac{vn}{v+n}(\bar{\mu}_0 - \bar{m}_n)(\bar{\mu}_0 - \bar{m}_n)'$$

$$S_n = \sum_{i=1}^{n} (\bar{x}_i - \bar{m}_n)(\bar{x}_i - \bar{m}_n)'$$

$$\bar{m}_n = \frac{1}{n} \sum_{i=1}^{n} \bar{x}_i$$

wherein bold-face symbols denote square matrices, symbols with overlines denote (one dimensional) vectors, the 'symbol denotes transpose, and || denotes determinant.

Also, n represents a number of records in the data. $\Gamma$ is a gamma function satisfying $\Gamma(x) = (x-1)\Gamma(x-1)$. A symbol $\bar{x}_i$ denotes a vector of values for relevant variables in the ith case in the data. The superscripts TR and R in $T_n^{TR}$ and $T_n^{R}$ denote that the matrices are defined with respect to target and regressor variables in the first case and merely regressor variables in the second case. That is, when computing $T_n^{TR}$ in the numerator, the vectors and matrices have one more dimension than when computing $T_n^{R}$ in the denominator. As can be appreciated, the scoring component 210 can compute the above score in various stages and/or orderings as will be illustrated in the examples below.

FIGS. 3-7 illustrate methodologies for automatically scoring and evaluating decision trees in accordance the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention. Also, it is to be appreciated that although the following methodologies may utilize particular values for purposes of explanation, a plurality differing variable values may be employed depending on the data analyzed.

Figure 3:
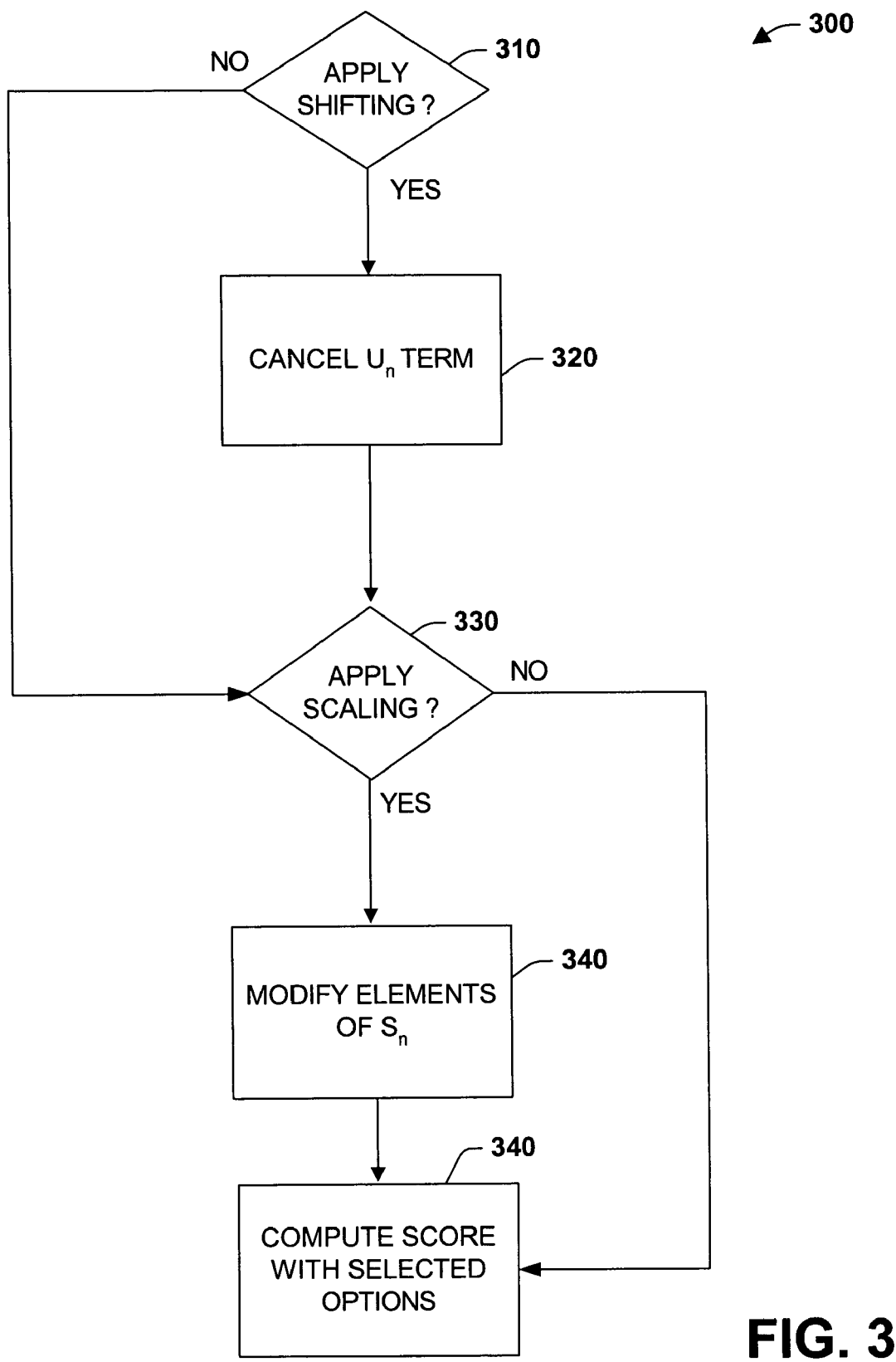
FIG. 3 is a flow diagram illustrating an example shifting and scaling determination in accordance with an aspect of the present invention.

Turning to FIG. 3, a process 300 illustrates an example shifting and/or scaling determination in accordance with an aspect of the present invention. The score described above with respect to FIG. 2 can be computed as if there were shift and/or scale operations performed on the data without actually performing the operation (e.g., virtual shifting and/or scaling). Alternatively, the present invention can be implemented (in a somewhat non-efficient manner) by, for each candidate split score, modifying the data by actually shifting and/or scaling the data and computing the above score on the resulting (modified) $x_i$, (i=1 to n) data. Proceeding to 310 of FIG. 3, a determination is made as to whether to perform a virtual shifting operation. If no virtual shifting operation occurs, the process proceeds to 330. If virtual shifting is to occur, the process proceeds to 320.

At 320, if the data were shifted, it is known that all of the ($\bar{\mu}_0 - \bar{m}_n$) terms described above will be zero, and hence the $U_n$ term from the scoring component in the computation of $T_n$ cancels. The matrix S obtains the same value, regardless of whether data is shifted or not, so it can be computed (as if data had shifted) without any explicit shift. Proceeding to 330, another determination is made as to whether to apply virtual scaling. If not, the process proceeds to 340 and computes a score with the shifting options if selected at 310. If scaling is selected at 330, the process proceeds to 340.

At 340, if the data were scaled, all elements of the matrix $S_n$ (or element subset) described above are adjusted. In particular, the (j,k) element of matrix $S_n$ are modified by dividing by the product of the sample standard deviations of each of the two variables. The sample standard deviation can be computed via:

$$SD(x^j) = \sqrt{\frac{1}{n}\sum_{i=1}^{n}(x_i^j - m_n^j)^2}$$

wherein $x_i^j$ denotes the value of the jth variable in the ith case of the data, and $m_n^j$ denotes the sample average for the jth variable. (Those of ordinary skill in the art will appreciate that there are alternative formula for the sample standard deviation.)

Figure 4:
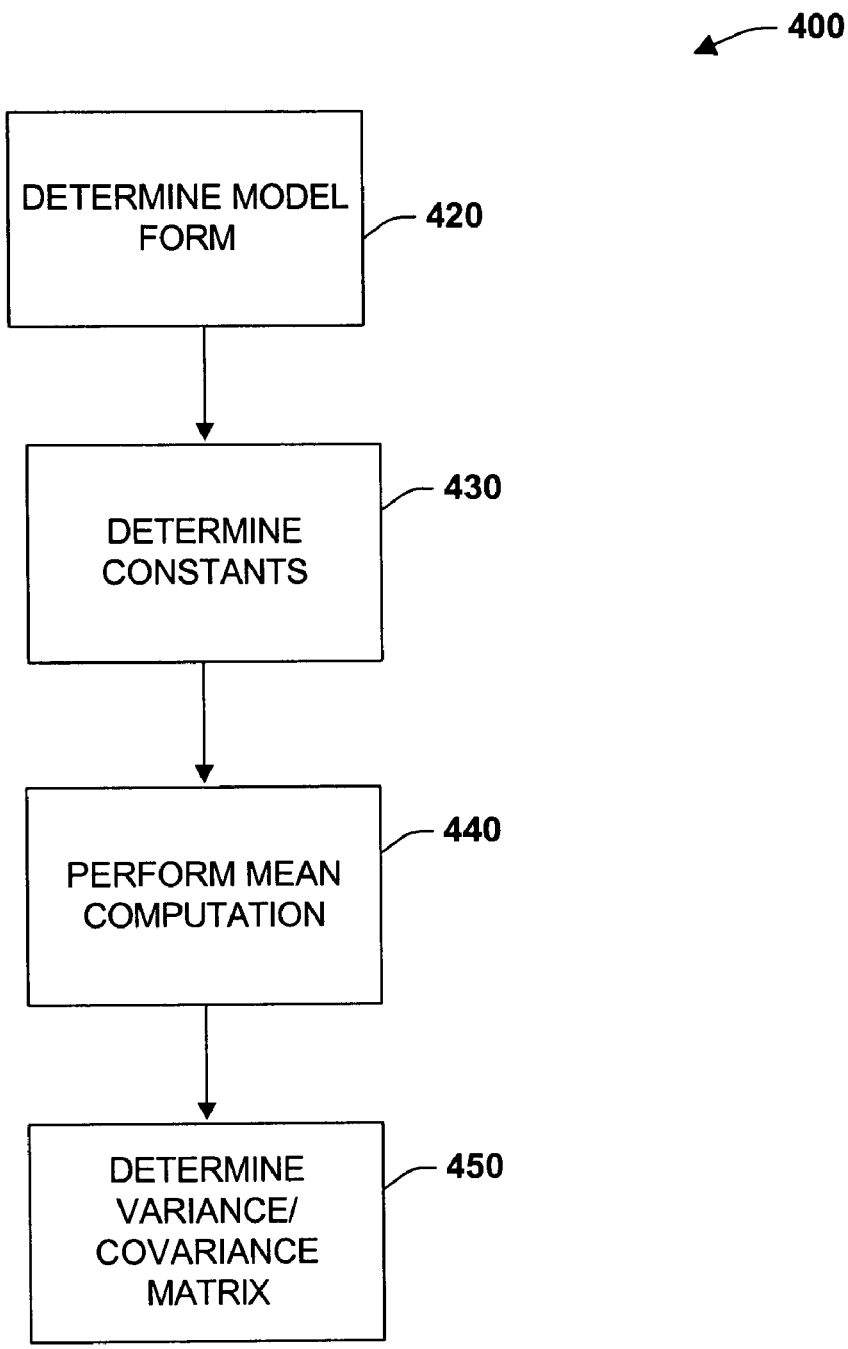
FIG. 4 is a flow diagram illustrating intermediate scoring processes in accordance with an aspect of the present invention.

Referring now to FIG. 4, a process 400 illustrates an example of intermediate scoring determinations in accordance with an aspect of the present invention. Proceeding to 420, a model form is selected or determined. For example, assume there are two variables T and R, where T is a target variable and R is a regressor variable. In other words, the model is a linear regression of the form:

$$T = a*R + b$$

Also, assume that the following data is at a particular leaf in a decision tree, and then calculate the score of that leaf using the score function described above with respect to FIG. 2.

|         | $x^T$ | $x^R$ |
|---------|-------|-------|
| Case 1  | 2     | 4     |
| Case 2  | 3     | 0     |
| Case 3  | 4     | -4    |

At 430, scoring constants are determined. In this case, the number of regressors r is 1, and the number of cases n is 3. In general, $\beta=0.01$ (or other value) and $v=1$ and thus, $\alpha=v+r+1=3$.

To compute the score, it is useful to collect the following statistics from the data by determining a mean computation at 440. Sample means of T and R, can be expressed as a vector (this vector is identical to $\overline{m}_n$ for computing the numerator of the score):

$$SampMean^{TR} = \left(\frac{1}{n}\sum_{i=1}^{n} x_i^T, \frac{1}{n}\sum_{i=1}^{n} x_i^R,\right)$$

$$= \left(\frac{1}{3}(2+3+4), \frac{1}{3}(4+0-4)\right) = (3, 0)$$

At 450, a sample variance/covariance matrix is determined as follows:

$$SampCov^{TR} =$$

$$\begin{pmatrix} \frac{1}{n}\sum_{i=1}^{n}(\overline{x}_i^T - \overline{m}_n^T) \times (\overline{x}_i^T - \overline{m}_n^T) & \frac{1}{n}\sum_{i=1}^{n}(\overline{x}_i^T - \overline{m}_n^T) \times (\overline{x}_i^R - \overline{m}_n^R) \\ \frac{1}{n}\sum_{i=1}^{n}(\overline{x}_i^R - \overline{m}_n^R) \times (\overline{x}_i^T - \overline{m}_n^T) & \frac{1}{n}\sum_{i=1}^{n}(\overline{x}_i^R - \overline{m}_n^R) \times (\overline{x}_i^R - \overline{m}_n^R) \end{pmatrix} =$$

-continued $$\begin{pmatrix} \frac{1}{3}[(2-3)(2-3) + (3-3)(3-3) + & \frac{1}{3}[(2-3)(4-0) + (3-3) \\ (4-3)(4-3)] & (0-0) + (4-3)(-4-0)] \\ \frac{1}{3}[(4-0)(2-3) + (0-0)(3-3) + & \frac{1}{3}[(4-0)(4-0) + (0-0) \\ (-4-0)(4-3)] & (0-0) + (-4-0)(-4-0] \end{pmatrix} =$$

$$\begin{pmatrix} \frac{2}{3} & \frac{-8}{3} \\ \frac{-8}{3} & \frac{32}{3} \end{pmatrix}$$

Those of ordinary skill in the art will appreciate that there are alternative formula for the sample covariance. Also, as noted above, the particular numbers employed in these examples are for illustrative purposes and other values can be selected. From the sample mean and sample covariance matrix, the appropriate vectors can be extracted in the computation for score.

Figure 5:
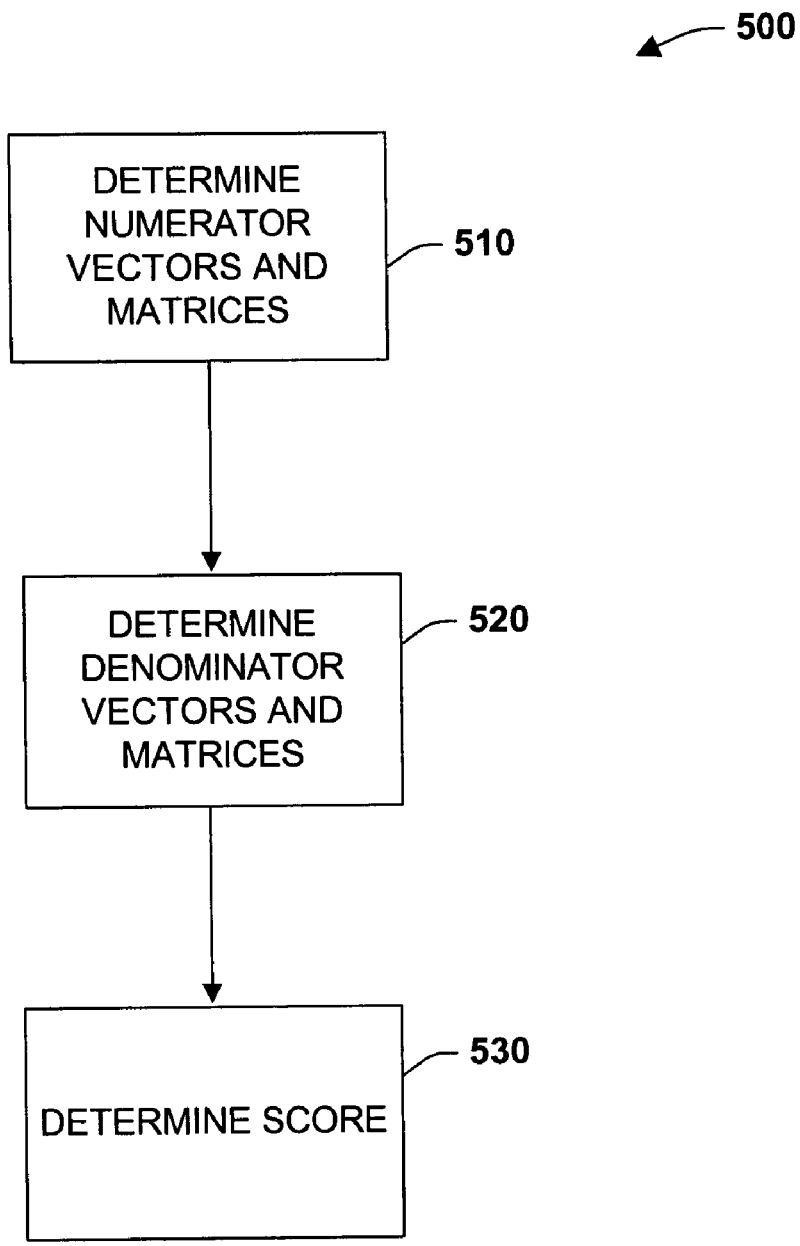
FIG. 5 is a flow diagram illustrating an example scoring process in accordance with an aspect of the present invention.

FIG. 5 illustrates an example scoring process that is a continuation of the process described with respect to FIG. 4. At 510, assuming no shifting and/or scaling is selected, numerator vectors and matrices are determined as follows:

A. The numerator $T_n^{TR}$

In this case, the vectors and matrices are defined for $x^T$ and $x^R$:

$$T_0^{TR} = \begin{pmatrix} 0.01 & 0 \\ 0 & 0.01 \end{pmatrix}$$

$$U_n^{TR} = \frac{1 \times 3}{1+3}\begin{bmatrix} 0 & -3 \\ 0 & -0 \end{bmatrix}[0 - 3 \quad 0 - 0] = \frac{3}{4}\begin{pmatrix} 9 & 0 \\ 0 & 0 \end{pmatrix} = \begin{pmatrix} \frac{27}{4} & 0 \\ 0 & 0 \end{pmatrix} =$$

$$S_n^{TR} = n \times SampCov^{TR} = \begin{pmatrix} 2 & -8 \\ -8 & 32 \end{pmatrix}$$

and therefore $$T_n^{TR} = \begin{pmatrix} \frac{876}{100} & -8 \\ -8 & \frac{3201}{100} \end{pmatrix} \text{ and } |T_n^{TR}| = 216.4076$$

At 520, denominator vector and matrices are determined.

B. The denominator $T_n^R$ is computed almost the same as above, but instead of having 2×2 dimensional matrices and 2 dimensional vectors over both the target and regressor, 1×1 dimensional matrices and 1 dimensional vectors are applied over the regressor. In general, the T matrix for the denominator can be extracted directly from the T matrix for the numerator by pulling out the row and column corresponding to the target. In this example, this includes removing the top row and left-most column, leaving:

$$T_n^R = \left(\frac{3201}{100}\right) \text{ and } |T_n^R| = 32.01$$

Given these matrices then the score can be computed at 530 as:

$$\text{score} = \pi^{-3/2}\left(\frac{1}{1+3}\right)^{1/2}\frac{\Gamma\left(\frac{3+3}{2}\right)}{\Gamma\left(\frac{3}{2}\right)}\left(0.01^{\frac{3+1}{2}}\right)\frac{(216.4076)^{-\left(\frac{3+3}{2}\right)}}{(32.01)^{-\left(\frac{3-1+3}{2}\right)}}$$

Figure 6:
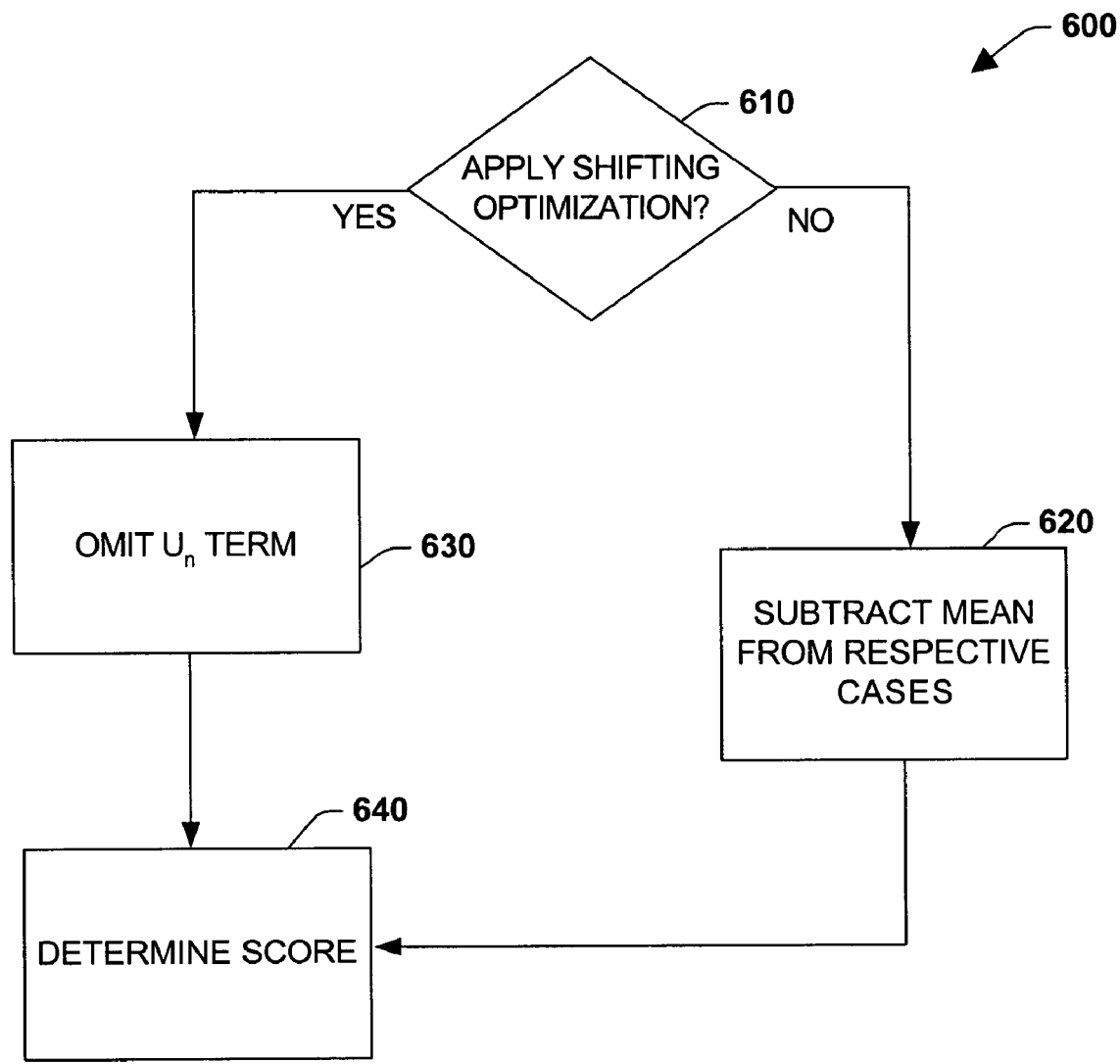
FIG. 6 is a flow diagram illustrating a shifting determination in accordance with an aspect of the present invention.
Figure 7:
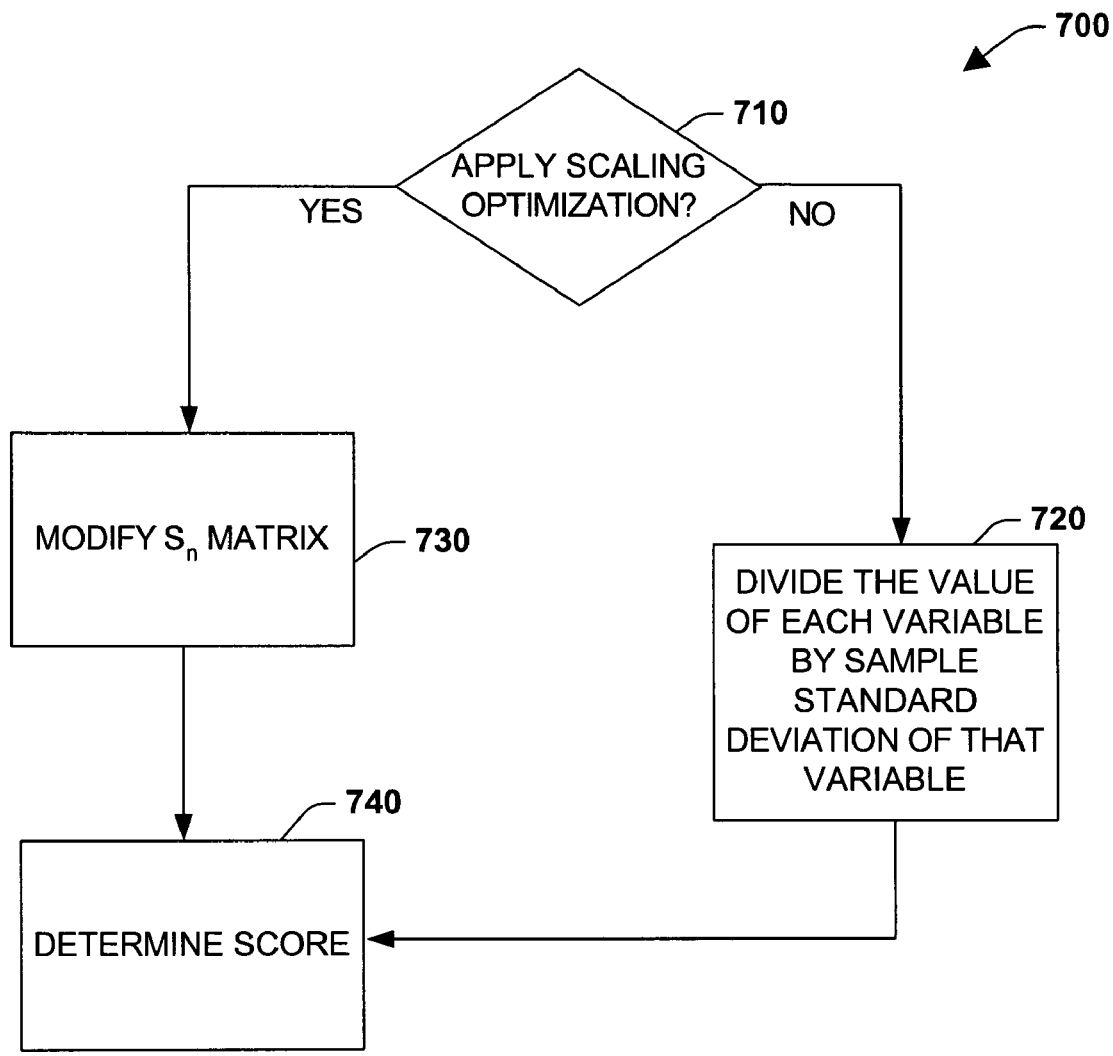
FIG. 7 is a flow diagram illustrating a scaling determination in accordance with an aspect of the present invention.

FIGS. 6 and 7 illustrate example scaling and/or scoring optimizations in accordance with an aspect of the present invention. Proceeding to 610 of FIG. 6, a determination is made as to whether to apply the shifting optimization. If not, the mean is subtracted from each case in the data at 620 and the scoring is determined as described with respect to FIG. 2. If the shifting optimization is desired at 610, the $U_n$ term can be omitted at 630 when calculating $T_n$ before determining the score at 640. For example:

$$T_n^{TR}\text{shifted} = T_0^{TR} + S_n^{TR} = \begin{pmatrix} \frac{201}{100} & -8 \\ -8 & \frac{3201}{100} \end{pmatrix}$$

A similar determination for scaling is illustrated at FIG. 7. For example, if scaling optimization is not selected at 710, then divide the value of each variable in each case by the sample standard deviation of that variable and determine the score at 740 as described above with respect to FIG. 2. If scaling optimization is selected at 710, divide each element in $S_n$ by the corresponding sample standard deviations as described above. It is noted that the sample standard deviation for a variable is the square root corresponding diagonal element in the sample variance/covariance matrix $\text{SampCov}^{TR}$. Thus:

$$S_n^{TR}\text{scaled} = \begin{pmatrix} \frac{2}{\sqrt{\frac{2}{3}}\times\sqrt{\frac{2}{3}}} & \frac{-8}{\sqrt{\frac{2}{3}}\times\sqrt{\frac{32}{3}}} \\ \frac{-8}{\sqrt{\frac{32}{3}}\times\sqrt{\frac{2}{3}}} & \frac{32}{\sqrt{\frac{32}{3}}\times\sqrt{\frac{32}{3}}} \end{pmatrix}$$

and $$T_n^{TR}\text{scaled} = T_0^{TR} + S_n^{TR}\text{scaled} + U_n^{TR}$$

As can be appreciated, both shifting and scaling optimizations can be selected. Thus, the data can be adjusted by first subtracting the mean and then dividing by the standard deviation, or apply both shifting and scaling optimizations as follows:

$$T_n^{TR}\text{shifted/scaled} = T_0^{TR} + S_n^{TR}\text{scaled}$$

Figure 8:
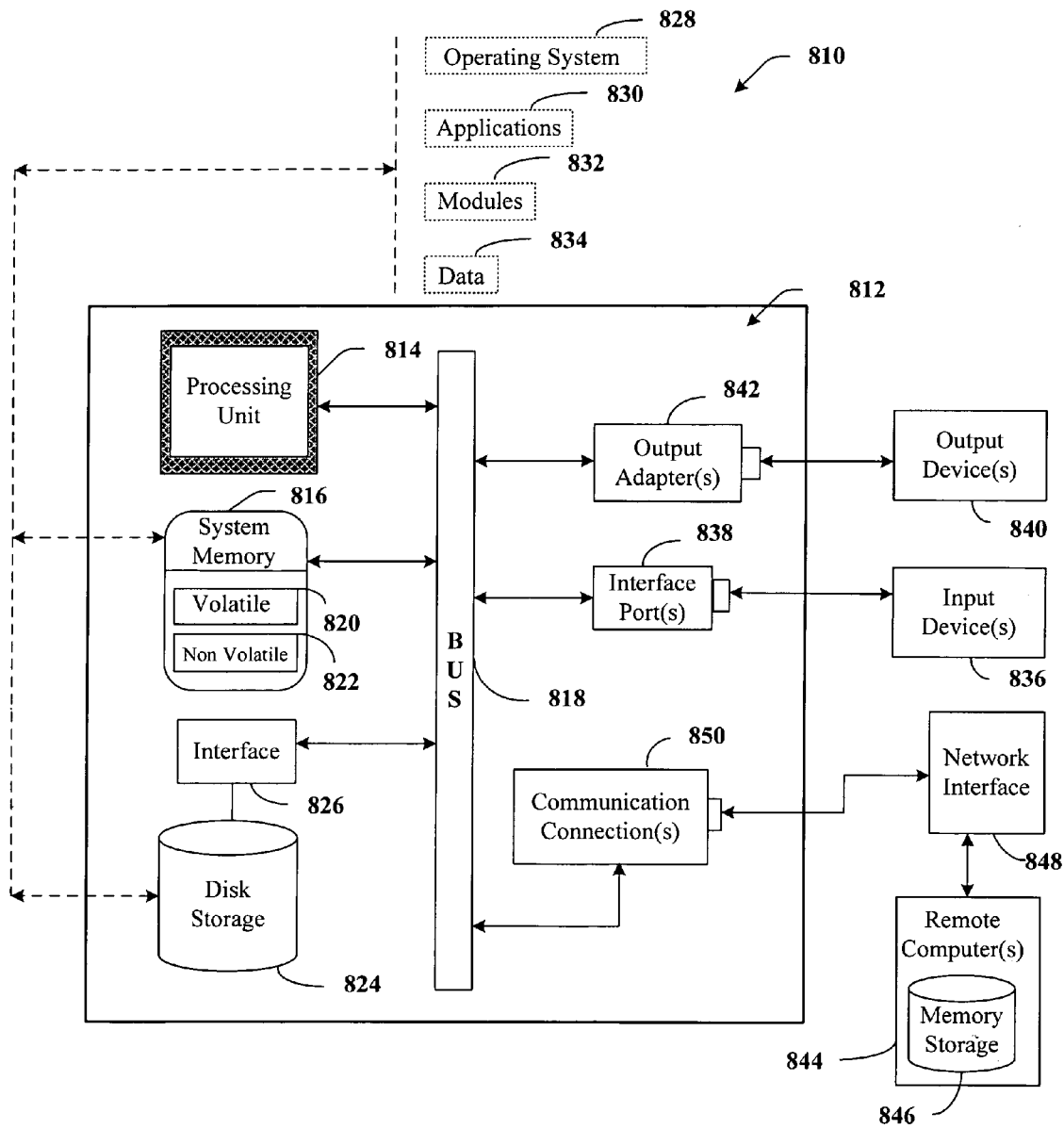
FIG. 8 is a schematic block diagram illustrating a suitable operating environment in accordance with an aspect of the present invention.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
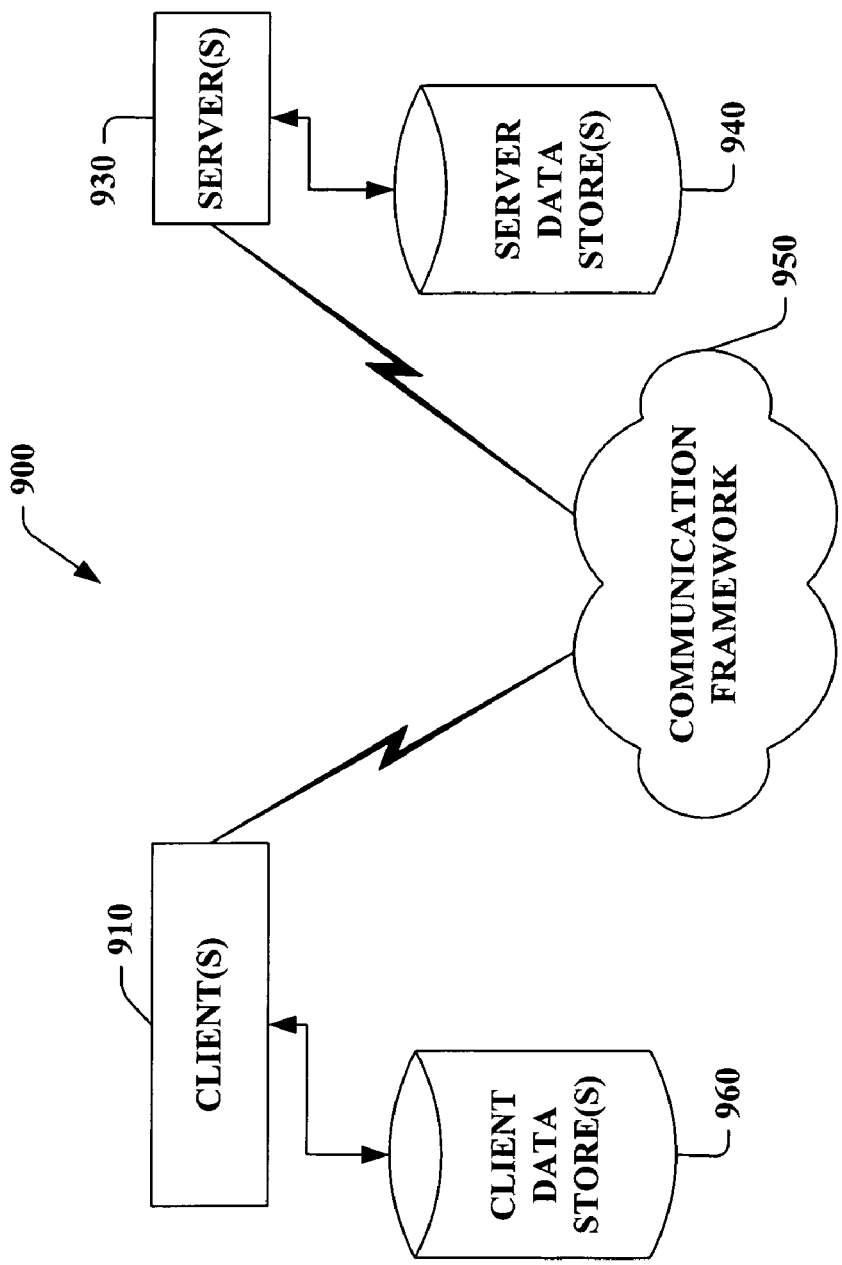
FIG. 9 is a schematic block diagram of a sample-computing environment with which the present invention can interact.

FIG. 9 is a schematic block diagram of a sample-computing environment 900 with which the present invention can interact. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the present invention, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system embodied on a computer-readable storage medium that facilitates decision tree learning, comprising:
    a learning component that generates non-standardized data having a non-zero mean that relates to a split in the decision tree, the non-standardized data related to a statistical model that produced the decision tree; and
    a scoring component that assigns a score to the split as if the non-standardized data at a subset of leaves of the decision tree had been at least one of shifted or scaled, the non-standardized data is at least one of virtually shifted through omission of a matrix operation or virtually scaled though the modification of a subset of elements relating to a covariance matrix, the score is employed to evaluate the performance of the statistical model for a data mining application that evaluates personal data.

2. The system of claim 1, further comprising a modification component that for a respective candidate split score, the data is modified by shifting or scaling the data and a new score is computed on the modified data.

3. The system of claim 1, further comprising an optimization component that analyzes the data and decides to treat the data as if it was: (1) shifted, (2) scaled, or (3) shifted and scaled.

4. The system of claim 1, the scoring component is employed for evaluating a data mining application.

5. The system of claim 1, the learning component processes continuous variable data or data subsets.

6. The system of claim 1, the scoring component generates evaluation data indicating how well a model predicts continuous target data and whether or not the model is a suitable predictor for the target data.

7. The system of claim 6, the evaluation data is employed by users or subsequent automated components when determining model performance or selecting between models or model subsets.

8. The system of claim 1, the scoring component includes at least one of a data sample processor, a scoring constant, a gamma function, a matrix value, a vector value, and a mean value for data or a data subset.

9. The system of claim 1, the scoring component computes a Bayesian linear regression score as:

$$\text{score} = \pi^{-n/2} \left(\frac{v}{v+n}\right)^{1/2} \frac{\Gamma\left(\frac{\alpha+n}{2}\right)}{\Gamma\left(\frac{\alpha}{2}\right)} \left(\beta^{\frac{\alpha+r}{2}}\right) \frac{(|T_n^{TR}|)^{-\left(\frac{\alpha+n}{2}\right)}}{(|T_n^{R}|)^{-\left(\frac{\alpha-1+n}{2}\right)}},$$

$$T_n = T_0 + S_n + U_n$$

$$U_n = \frac{vn}{v+n}(\bar{\mu}_0 - \bar{m}_n)(\bar{\mu}_0 - \bar{m}_n)'$$

$$S_n = \sum_{i=1}^{n}(\bar{x}_i - \bar{m}_n)(\bar{x}_i - \bar{m}_n)'$$

$$\bar{m}_n = \frac{1}{n}\sum_{i=1}^{n}\bar{x}_i$$

wherein μ represents a mean, α denotes a degree of freedom, β connotes a pre-defined constant, bold-face symbols denote square matrices, symbols with overlines denote (one dimensional) vectors, the ' symbol denotes transpose, and || denotes determinant, n represents a number of records in the data, $\Gamma$ is a gamma function satisfying $\Gamma(x)=(x-1)\Gamma(x-1)$, $\overline{x}_i$ denotes a vector of values for relevant variables in an ith case in the data, the superscripts TR and R in $T_n^{TR}$ and $T_n^R$ denote that the matrices are defined with respect to target and regressor variables in a first case and regressor variables in a second case.

10. A system embodied on a computer-readable storage medium that facilitates decision tree learning, comprising:
   means for automatically generating a set of non-standardized data for a statistical model associated with a set or subset of data relating to a continuous variable, the non-standardized data associated with a split in the decision tree and having a non-zero mean; and
   means for automatically assigning a score to the split as if the non-standardized data were at least one of shifted or scaled, the non-standardized data is at least one of virtually shifted by omitting a matrix operation from automatically scoring the split or virtually scaled by modifying a subset of elements relating to a covariance matrix, the score is employed to evaluate the performance of the statistical model for a data mining application that evaluates personal data.

11. The system of claim 10, further comprising means for determining whether to perform the shifting operation and means for determining whether to perform the scaling operations.

12. The system of claim 10, further comprising means for shifting or scaling the set or subset of data relating to the continuous variable.

13. A computer implemented method that facilitates decision tree learning, comprising:
   determining whether to perform a virtual shifting operation on a non-standardized set of data with a non-zero mean associated with leaves of a decision tree, the non-standardized data related to a statistical model that produced the decision tree;
   determining whether to perform a virtual scaling operation on a non-standardized set of data associated with a non-zero mean associated with leaves of a decision tree, the non-standardized data related to a statistical model that produced the decision tree; and
   automatically assigning a score to the split as if the non-standardized data were at least one of virtual shifted or virtual scaled, the virtual shifting operation includes omitting a matrix operation from the assignment of scores and virtual scaling operation includes modifying a subset of elements relating to a covariance matrix, the scores are employed to evaluate the performance of a statistical model that produced the decision tree for data mining application that evaluates personal data.

14. The method of claim 13, further comprising performing at least one actual scaling or actual shifting operation on the non-standardized set of data.

15. The method of claim 13, further comprising processing a model in a form of a linear regression.

16. The method of claim 13, determining at least one constant value before assigning the scores.

17. The method of claim 16, the constant value relates to diagonal elements of a matrix and is assigned a value of about 0.01.

18. A computer readable storage medium that includes a tangible component that has a data structure stored thereon, comprising:
   a first set of data fields describing a non-standardized set or subset of data relating to a continuous variable;
   a second set of data fields describing a decision tree and associated branches; and
   a third set of data fields describing a score for the branches, the score computed for the branches as if the non-standardized set or subset of data had been shifted or scaled, the non-standardized set or subset is at least one of virtually shifted by omission of a matrix operation from the computed score or virtually scaled by modification of a subset of elements relating to a covariance matrix, the score is at least one of stored on a computer-readable storage medium, displayed on a display device, employed by one or more processes executing on one or more processors, or transmitted between two or more processes executing on one or more processors.

19. The computer readable medium of claim 18, further comprising a data field to indicate at least one of a virtual shifting operation and a virtual scaling operation.

20. The computer readable medium of claim 18, further comprising a data field to indicate at least a portion of the non-standardized set or subset of data to be shifted or scaled.

* * * * *